United States Patent [19]

Jones

[11] 4,026,377
[45] May 31, 1977

[54] VERTICAL CRANKSHAFT ENGINE HAVING LONGITUDINALLY OPPOSED CYLINDERS

[75] Inventor: Kenneth R. Jones, Thiensville, Wis.

[73] Assignee: Allis-Chalmers Corporation, Milwaukee, Wis.

[22] Filed: Dec. 2, 1975

[21] Appl. No.: 636,826

[52] U.S. Cl. .................. 180/64 R; 123/56 AA; 123/52 M; 180/54 R; 181/36 D
[51] Int. Cl.² ........................................ B60K 5/06
[58] Field of Search ............ 180/64 R, 64 A, 54 R, 180/54 A, 54 D, 70 R; 123/56 R, 56 AA, 56 AB, 56 AC, 56 A, 56 B, 56 BB, 56 BA, 65 A, 65 BA, 52 M; 181/36 B, 36 D

[56] References Cited
UNITED STATES PATENTS

| 663,475 | 12/1900 | Smith | 123/56 AA |
|---|---|---|---|
| 888,405 | 5/1908 | Lavigne | 180/54 R |
| 1,567,805 | 12/1925 | Mock | 180/54 A |
| 1,845,702 | 2/1932 | Evinrude | 123/56 BA |
| 2,178,246 | 10/1939 | Towle | 123/56 BA |
| 2,516,669 | 7/1950 | Beck | 123/56AA |
| 2,541,973 | 2/1951 | Wiegman | 180/64 A |
| 2,627,255 | 2/1953 | Kiekhaefer | 123/65 A |
| 3,230,944 | 1/1966 | Kiekhaefer | 123/56 AA |
| 3,311,186 | 3/1967 | Kamlukin | 180/70 R |
| 3,605,705 | 9/1971 | Ziegler | 123/56 BA |

Primary Examiner—Joseph F. Peters, Jr.
Assistant Examiner—David M. Mitchell
Attorney, Agent, or Firm—Charles L. Schwab

[57] ABSTRACT

A riding tractor with an elongated longitudinal frame is provided with a vertical crankshaft internal combustion engine having opposed pistons aligned in the longitudinal vertical plane of the tractor. In operation of the engine a dynamic force couple is created by the vertical spacing of the cylinders which induces vibrations tending to pivot the engine about its base, which is secured to the frame of the tractor. The frame has a relatively large moment of inertia about its wheeled support which effectively resists the rocking movement of the engine in the longitudinal plane of the tractor. The engine crankshaft includes an output shaft portion extending downwardly from the engine to which V-belt pulleys are connected for driving the drive wheels of the tractor and an underslung rotary mower by appropriate V-belts. In one version of the engine each cylinder has its own carburetor, intake manifold, exhaust manifold and muffler. In a second version of the engine, the air intake manifold and ports are located at one lateral side of the engine and the exhaust ports and manifold are located at the other lateral side of the engine. This provides maximum isolation of the carburetor from the hot exhaust system. In a third version of the engine both air intake and exhaust manifolding and ports are located on one lateral side of the engine. In the second version of the engine the intake manifold and carburetor are disposed below the exhaust manifold and muffler so that the heat rising from the exhaust manifold and muffler will not pass over the carburetor.

2 Claims, 14 Drawing Figures

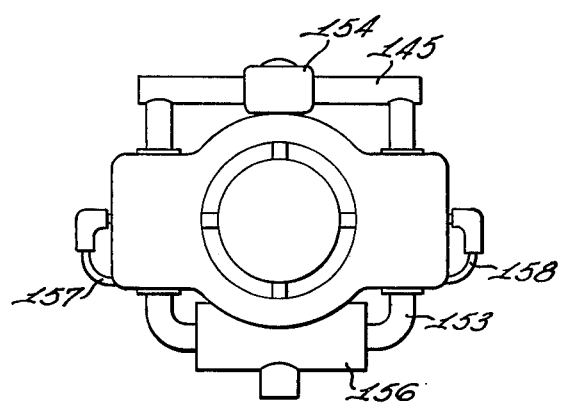
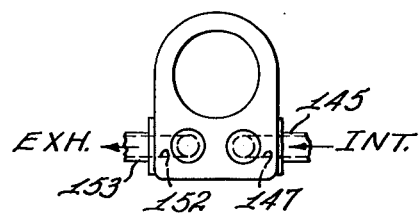
Fig. 4 Fig. 7
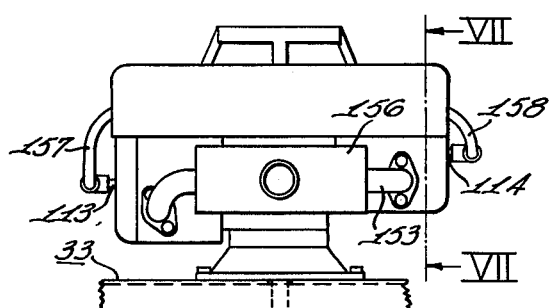
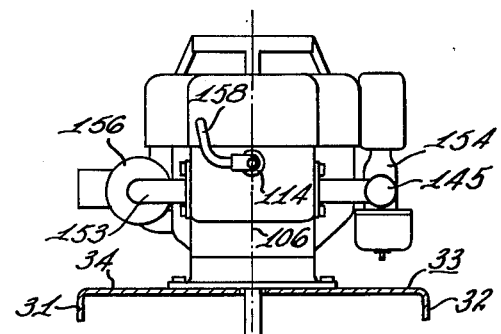
Fig. 5 Fig. 6
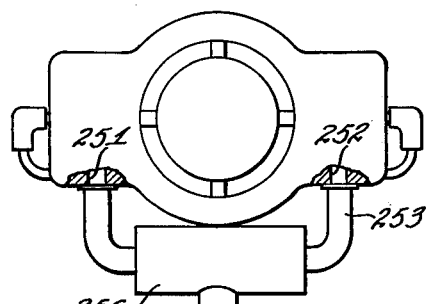
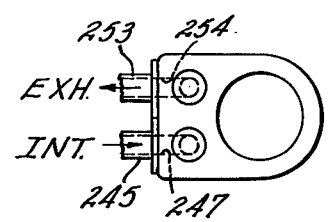
Fig. 8 Fig. 11
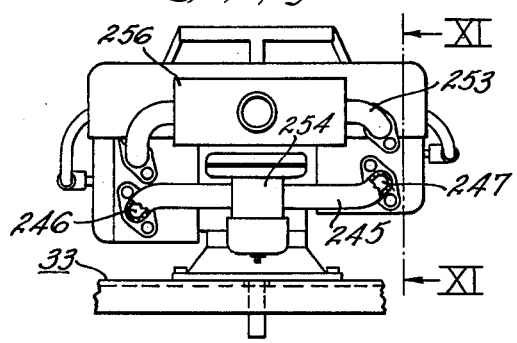
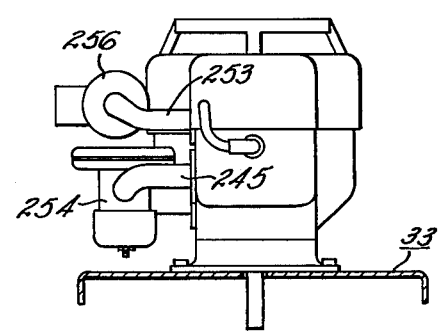
Fig. 9 Fig. 10

VERTICAL CRANKSHAFT ENGINE HAVING LONGITUDINALLY OPPOSED CYLINDERS

BACKGROUND OF THE INVENTION

Heretofore others have suggested the use of a single cylinder vertical crankshaft engine in a tractor such as illustrated in U.S. Pat. Nos. 3,311,186, 3,613,815 and 3,003,574. The axis of the single cylinder is horizontal and is longitudinally disposed in relation to the tractor. Such engines have primary unbalanced inertia forces acting at engine speed which are compensated for by appropriate counterweights rotating at engine speed. Such single cylinder engines, however, do not have a secondary moment of unbalance acting at twice engine speed which is created by the axial spacing of the connecting rods on the crankshaft as exists in a typical two-cylinder opposed piston engine. Because of the expense and space requirement for rotating means for balancing the secondary moment of unbalance, almost all, if not all, of the small horsepower engines presently manufactured for lawn and garden equipment do not include means for balancing the secondary moment of unbalance.

BRIEF DESCRIPTION OF THE INVENTION

The present invention provides a vertical crankshaft engine with a pair of opposed cylinders disposed in longitudinal alignment in the longitudinal vertical plane of a small tractor having an elongated longitudinal frame. By orienting the opposed pistons in the vertical longitudinal plane of the tractor the secondary moment of unbalance vibrations are resisted and absorbed by the long longitudinal frame without undue shaking of the tractor and the operator. Three different configurations of an opposed piston engine are suggested, all of which have their cylinder axes in a longitudinal vertical plane. Due consideration has been given to excessive heating of the carburetor in prior art engines as for instance when the carburetor is mounted on the top side of a two-cylinder opposed piston engine. Excessive heating of the carburetor in the present invention is avoided either by placing the muffler and carburetor in longitudinally spaced relation to one another, by placing the exhaust and intake systems on opposite lateral sides of the engine or by placing the carburetor and intake manifold below the exhaust manifold and muffler at one lateral side of the engine.

It is an object of the present invention to provide an improved tractor with an opposed piston, vertical crankshaft engine with its vertically offset pistons aligned in the longitudinal vertical plane of the tractor whereby the tractor frame effectively absorbs the secondary engine vibrations without undue shaking of the tractor or operator discomfort.

It is a further ojbect of this invention to provide an improved opposed piston, vertical crankshaft engine wherein heating of the carburetor by engine produced heat is effectively minimized.

BRIEF DESCRIPTION OF THE DRAWINGS

The invention is illustrated in a series of drawings including:

FIG. 4 which is a top view of the engine shown in FIGS. 2 and 3;

FIG. 5 which is a side view of the engine shown in FIG. 4;

FIG. 6 which is an end view of the engine shown in FIG. 5;

FIG. 7 which is a vertical section view taken along the line VII—VII in FIG. 5;

FIG. 8 which is a top view of a third opposed piston engine having the intake and exhaust manifolding on the same lateral side of the engine;

FIG. 9 which is a side view of the engine shown in FIG. 8;

FIG. 10 which is an end view of the engine shown in FIG. 9;

FIG. 11 which is a vertical section taken along the line XI—XI in FIG. 9;

DETAILED DESCRIPTION OF THE DRAWINGS

Figure 1:
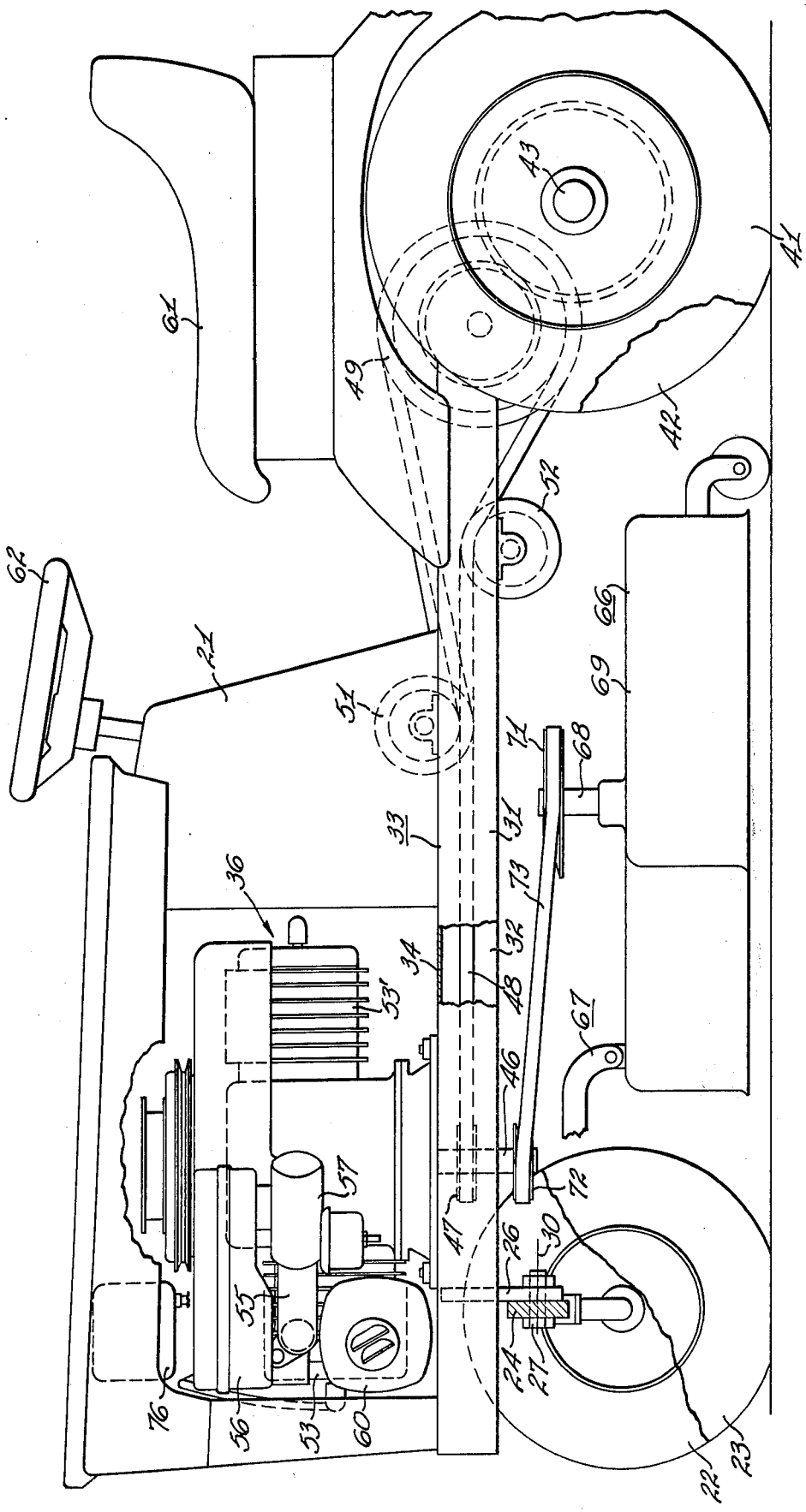
FIG. 1 showing a side view of a small riding tractor in which one version of the present invention is incorporated.

In FIG. 1, the present invention is illustrated in a small riding tractor 21 having a pair of front steerable wheels 22, 23 mounted on opposite ends of a transverse axle 24 which is pivoted on a longitudinal axis 30 to a transverse brace 26 by a suitable longitudinally disposed pin 27. The transverse brace 26 is secured at its opposite ends as by welding to downwardly extending flanges 31, 32 of an elongated longitudinally disposed main frame 33. The main frame 33, as shown in the various drawings including FIGS. 5 and 6, includes a horizontal portion 34 on which various portions of the tractor are mounted, including a two cylinder air cooled engine 36.

The rear end of the elongated main frame 33 is supported by a pair of driving wheels 41, 42 carried on an axle 43. The axle 43 is driven by the engine 36 through a pulley 47 nonrotatably secured to the lower end of a vertical crankshaft 46. Power is transmitted from the pulley 47 to the axle 43 by way of a V-belt 48 reaved around the pulley 47 and around a transmission V-belt pulley 49. Suitable idler pulleys 51, 52 are supported for rotation on the main frame 33 and engage the drive belt 48. An operator's seat 61 is provided at the rear end of the main frame 33 and a steering wheel 62 is connected by conventional steering linkage (not shown) to the steering wheels 22, 23.

A rotary mower 66 is connected to the front axle 24 by a suitable linkage 67. The rotating mower blade (not shown) is connected to a vertical shaft 68 rotatably mounted on the mower housing 69 and a V-belt pulley 71 is nonrotatably secured to the shaft 68. The lower end of the vertical crankshaft 46 of the engine 36 has a V-belt pulley 72 nonrotatably secured thereto for rotation therewith and a suitable V-belt 73 is reaved around the pulleys 71, 72.

Figure 14:
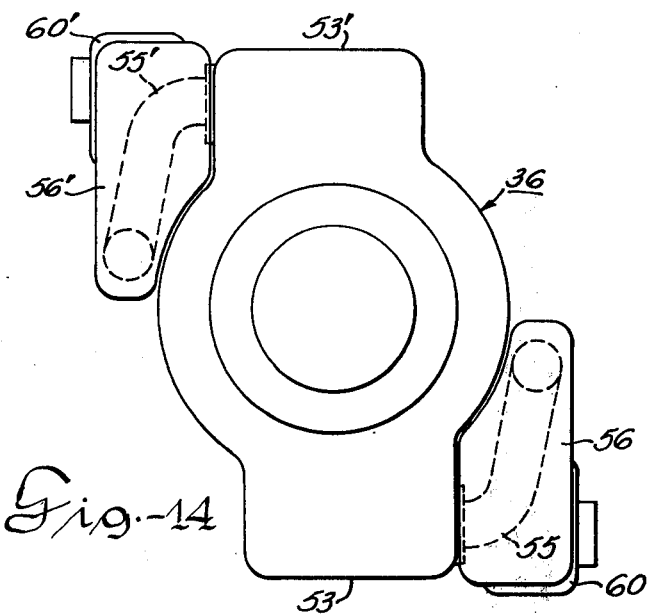
FIG. 14 which is a top view of the engine shown in FIG. 13.
Figure 13:
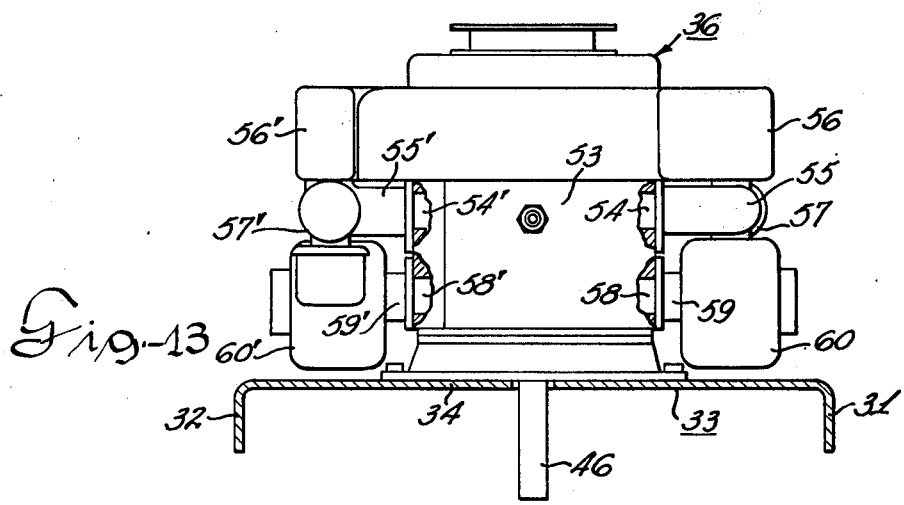
FIG. 13 which is an end view of the engine shown in FIG. 1.

FIGS. 13 and 14 show the engine 36 shown in FIG. 1 in front end and top views. It will be noted, in this version of the invention, that each cylinder has its own air filter, air intake, carburetor and exhaust systems. As shown, the front cylinder 53 has its intake port 54 connected to an intake manifold 55, an air filter 56 and a carburetor 57. The combustion products are exhausted from cylinder 53 by way of an exhaust port 58, an exhaust manifold 59 and a muffler 60. Similarly cylinder 53' has its intake port 54' connected to an intake manifold 55' an air filter 56' and a carburetor 57' and has its exhaust port 58' connected to an exhaust manifold 59' and a muffler 60'. A fuel tank 76 is connected to the carburetors 57, 57' respectively, by means not shown.

Figure 2:
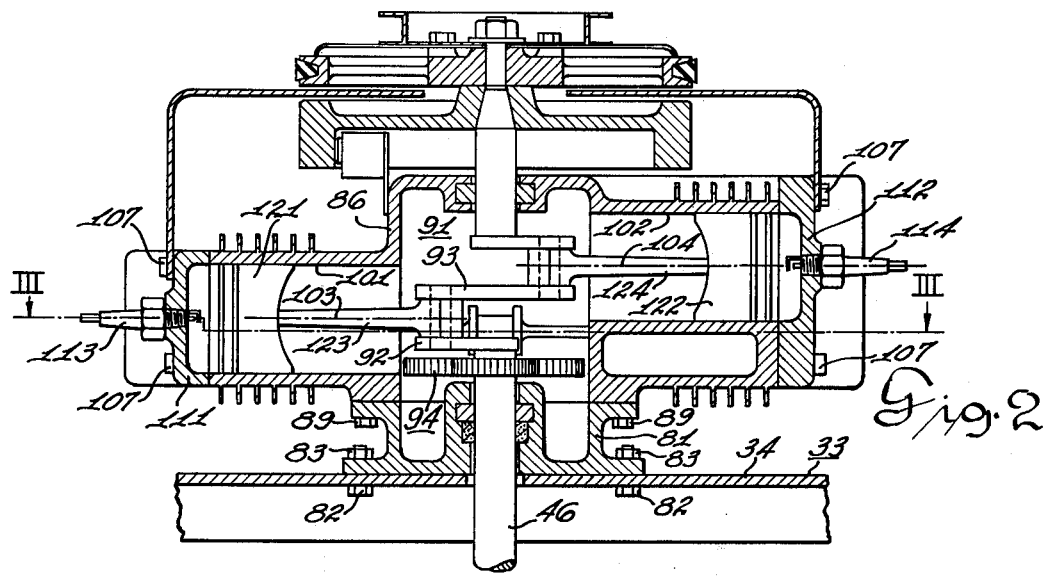
FIG. 2 which is a longitudinal vertical section of a second version of an engine of the present invention.

FIG. 2 shows a second version of the invention wherein an engine has a base or mounting pad 81 which is bolted to the horizontal portion 34 of the tractor main frame 33 by releasable fastening means in the form of bolts 82 and nuts 83. A main engine housing or cylinder block 86 is rigidly secured to the mounting pad 81 by suitable fastening means such as cap screws 89. The cylinder block 86 includes walls defining a central cavity crankcase 91 which is of sufficient dimension to accommodate the vertically spaced cranks 92, 93 of the crankshaft 46 and the valve gearing 94. The engine block 86 also includes walls defining a pair of opposed cylinders having bores 101, 102 on parallel axes 103, 104 which lie in the vertical, longitudinal plane of the engine as shown by line 106 in FIG. 3. When installed on a tractor, such as shown in FIG. 1, the vertical longitudinal plane of the engine coincides with the vertical longitudinal plane of the tractor. Suitable piston heads or housings 111, 112 are connected to the opposite ends of the engine block 86 by suitable releasable fastening means, such as cap screws 107. The cylinder heads 111, 112 carry suitable ignition devices, such as spark plugs 113, 114. A pair of opposed pistons 121, 122 are reciprocally mounted in the cylinder bores 101, 102 and are connected in a conventional manner to the cranks 92, 93 of the crankshaft 46 by connecting rods 123, 124.

Figure 3:
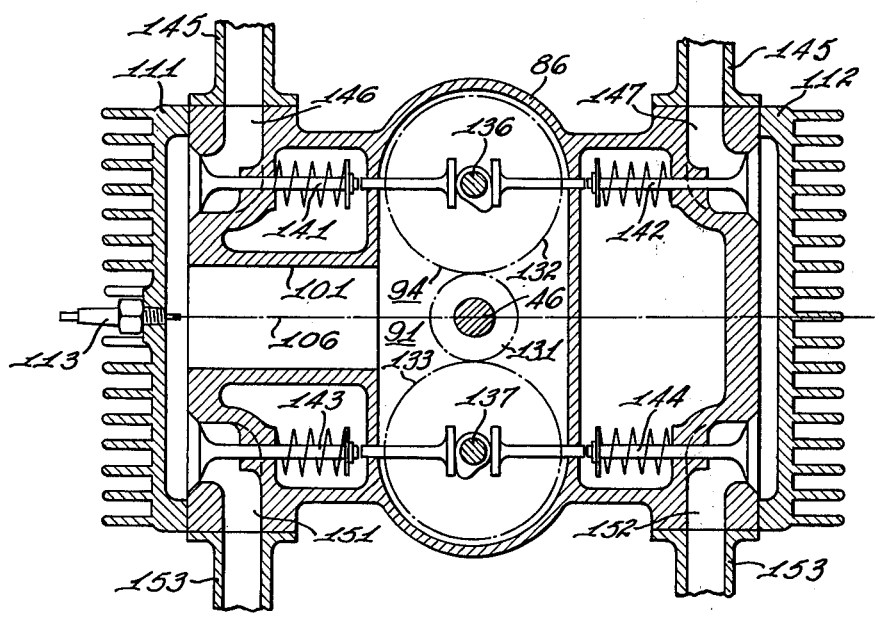
FIG. 3 which is a horizontal section of the engine shown in FIG. 2 showing the intake and exhaust valves.
Figure 12:
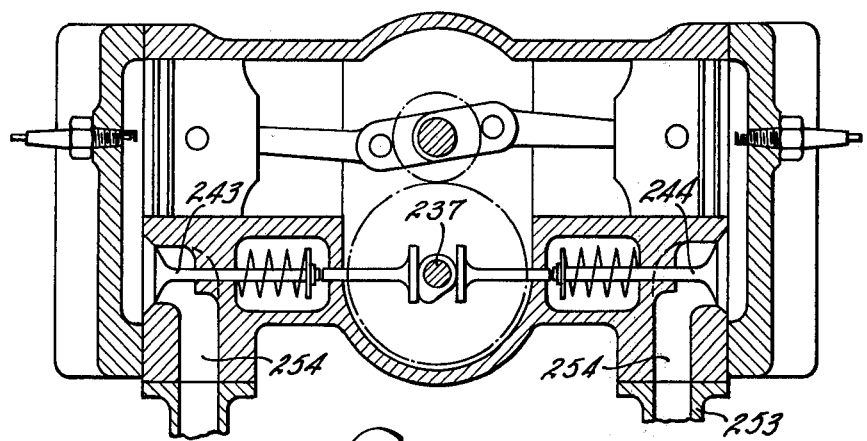
FIG. 12 which is a horizontal section through the engine shown in FIGS. 8, 9 and 10.

As shown in FIG. 3, the valve gearing 94 includes a central valve gear 131 meshing with a pair of valve gears 132, 133, the latter being secured for rotation with cam shafts 136, 137. During operation of the engine, the valve gearing 94 comprised of gears 131, 132 and 133 causes the intake valves 141, 142 and exhaust valves 143, 144 to be operated so as to admit air by way of the air intake manifold 145 and intake ports 146, 147 and exhaust of combustion products by way of exhaust ports 151, 152 and exhaust manifold 153. As shown in FIGS. 4, 5 and 6, the intake manifold 145 has connected thereto a carburetor 154 and the exhaust manifold 153 has connected thereto a suitable muffler 156. A suitable ignition system is provided for the engine so as to provide electrical impulses to spark plugs 113, 114 by way of spark plug leads 157, 158. Although this invention is illustrated in a spark ignition engine, it should be understood that other types of internal combustion engines such as diesel engines may also be used to utilize this invention. FIGS. 5 and 6 show side and end views of the same engine as illustrated in FIGS. 2, 3 and 4.

FIG. 7 shows the exhaust port 152 and exhaust manifold 153 at one lateral side of the engine housing structure and the intake port 147 and intake manifold 145 at the other lateral side of the engine housing structure.

The third configuration of an engine utilizing the present invention is shown in FIGS. 8, 9, 10, 11 and 12 wherein the exhaust ports 251, 252 and the exhaust manifold 253 are disposed above the intake ports 246, 247 and the intake manifold 245. The exhaust manifold 253 has incorporated therewith a muffler 256 and a carburetor 254 is connected to the intake manifold 245. By placing the muffler 256 above the carburetor 254, the rising heat from the muffler will not pass around the carburetor 254 and the latter will tend to remain cooler than if the positions were reversed. One advantage of the engine configuration of FIGS. 8, 9, 10, 11 and 12 is that a single cam shaft 237 carries both the intake and exhaust cams for operating the exhaust valves 243, 244 and the intake valves (not shown).

During operation of any of the illustrated engines, the vertically offset relationship between the cylinders will give rise to secondary unbalanced inertia forces tending to pivot the engine on its mounting in its longitudinal, vertical plane. This provides a vibration which will tend to shake the tractor and operator. Although Lanchester balancers have been well known in the art for many years since their suggestion by Lanchester in his patents such as U.S. Pat. No. 1,163,832, such balancers are expensive and are not provided in most two-cylinder, air cooled engines in the small horsepower range such as are contemplated to be used in the illustrated lawn and garden tractor. In the present invention the opposed piston vertical crankshaft engine is mounted on the elongated tractor main frame 33 with the cylinders lying in a longitudinal, vertical plane. Thus, these secondary vibrations caused by the vertical spacing of the axes of the two opposed pistons are resisted by the main frame 33 in a longitudinal plane. As is apparent from the construction of the garden tractor such as is illustrated, the frame is better capable of absorbing and resisting these forces in a longitudinal plane than it would in a transverse plane. For instance, if the engine were mounted with the opposed pistons disposed in a lateral or transverse plane, the rocking motion created by the secondary forces of unbalance would cause the main frame 33 to rock about the longitudinal pivot axis 30 of the front axle pivot pin 27. This vibration would not only tend to adversely affect the life fo various components of the tractor, but would be annoying to the operator. In the present invention the secondary vibrations of a vertical crankshaft, opposed piston engine are conveniently absorbed by the tractor main frame thus minimizing shaking, noise and operator discomfort.

Excessive heating of the carburetor has been avoided in the first version of the engine (FIGS. 1, 13 and 14) by spacing the carburetor horizontally from the exhaust manifold and muffler, in the second version of the engine (FIGS. 2–7) by placing the carburetor and exhaust apparatus on opposite lateral sides of the engine and in the third version of the engine (FIGS. 8–11) by placing the exhaust apparatus above, rather than below, the carburetor. Each engine has distinctive features influencing its selection for a particular application. The first version (FIGS. 1, 13, and 14) uses the same manifolds, air filters, carburetors, and mufflers as are used on the single cylinder version of the engine, thus economizing on tooling, engineering, space parts requirements and perhaps more importantly on fuel consumption. The second version achieves superior isolation of the exhaust and carburetor systems, however, two cam shafts are required. The third version requires only one cam shaft and the isolation of the exhaust system, while adequate for most installations, is not as effective as the second version.

The embodiments of the invention in which an exclusive property or privilege is claimed are defined as follows:

1. In a tractor having longitudinally spaced front and rear wheels, the combination comprising:
   a longitudinally elongated main frame supported at its longitudinally opposite ends by said front and rear wheels and
   an internal combustion engine disposed substantially above said main frame having
   a housing structure rigidly secured to said main frame and including walls defining a crankcase cavity and a pair of opposed cylinders with vertically spaced parallel axes lying in a vertical longitudinal plane;
   a piston in each cylinder;
   a vertically disposed crankshaft rotatably mounted in said housing structure having an output shaft portion extending from the bottom side of said housing structure and a pair of vertically spaced crank arms disposed in said crankcase cavity;
   connecting rods interconnecting said crank arms and pistons;
   wall means defining a cylinder intake port in one lateral side of said housing structure for each of said cylinders;
   wall means defining a cylinder exhaust port in said one lateral side of said housing structure for each of said cylinders, said exhaust ports being disposed above said intake ports, respectively;
   an intake manifold interconnecting said intake ports and disposed at said one lateral side of said housing;
   a carburetor connected to said intake manifold and disposed at said one lateral side of said housing;
   an exhaust manifold interconnecting said exhaust ports and disposed at said one lateral side of said housing above said intake manifold; and
   a muffler connected to said exhaust manifold and disposed at said one lateral side of said housing above said carburetor, whereby heat rising from said muffler will not pass over said carburetor.

2. The engine of claim 1 wherein said muffler is incorporated in said exhaust manifold between said exhaust ports.

* * * * *